(12) United States Patent
Stallings et al.

(10) Patent No.: US 9,075,523 B2
(45) Date of Patent: Jul. 7, 2015

(54) REMOTE CONTROL EMULATION METHODS AND SYSTEMS

(75) Inventors: Heath Stallings, Colleyville, TX (US);
Daniel S. Dunnam, Brooklyn, NY (US);
Nathan J. Maxfield, Wakefield, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 665 days.

(21) Appl. No.: 12/971,964

(22) Filed: Dec. 17, 2010

(65) Prior Publication Data

US 2012/0159372 A1    Jun. 21, 2012

(51) Int. Cl.
*G06F 3/0481* (2013.01)
*G06F 3/0488* (2013.01)
*H04N 21/422* (2011.01)

(52) U.S. Cl.
CPC ...... *G06F 3/04883* (2013.01); *H04N 21/42208* (2013.01); *H04N 21/4222* (2013.01); *H04N 21/42224* (2013.01)

(58) Field of Classification Search
CPC .................................................. G06F 3/0481
USPC .......................................... 715/773, 740, 839
See application file for complete search history.

(56) References Cited

U.S. PATENT DOCUMENTS

| | | | |
|---|---|---|---|
| 5,552,806 A * | 9/1996 | Lenchik ........................ | 345/156 |
| 5,726,688 A * | 3/1998 | Siefert et al. .................. | 715/821 |
| 6,563,430 B1 * | 5/2003 | Kemink et al. ................ | 340/8.1 |
| 6,633,315 B1 * | 10/2003 | Sobeski et al. ................ | 715/762 |
| 6,765,557 B1 * | 7/2004 | Segal et al. .................... | 345/173 |
| 7,076,734 B2 * | 7/2006 | Wolff et al. ................... | 715/720 |
| 7,132,973 B2 * | 11/2006 | Jindal ............................ | 341/176 |
| 7,907,222 B2 * | 3/2011 | Haughawout et al. ........ | 348/734 |
| 8,015,446 B2 * | 9/2011 | Scott et al. ...................... | 714/25 |
| 2001/0015719 A1 * | 8/2001 | Van Ee et al. .................. | 345/158 |
| 2003/0095156 A1 * | 5/2003 | Klein et al. .................... | 345/864 |
| 2003/0103088 A1 * | 6/2003 | Dresti et al. ................... | 345/835 |
| 2004/0259537 A1 * | 12/2004 | Ackley .......................... | 455/420 |
| 2008/0238708 A1 * | 10/2008 | Pittard et al. ............. | 340/825.22 |
| 2009/0204928 A1 * | 8/2009 | Kallio et al. ................... | 715/799 |

FOREIGN PATENT DOCUMENTS

WO      WO 2007027949 A2 *   3/2007   ............. G06F 3/033

* cited by examiner

*Primary Examiner* — Matthew Ell

(57) ABSTRACT

An exemplary method includes a remote control emulation system directing a mobile device to display an emulation graphical user interface ("GUI") on a display screen of the mobile device and directing the mobile device to emulate one or more user input devices by selectively positioning one or more interactive graphical depictions of one or more feature sets associated with the one or more user input devices within the emulation GUI. Corresponding methods and systems are also disclosed.

19 Claims, 15 Drawing Sheets

REMOTE CONTROL EMULATION METHODS AND SYSTEMS

BACKGROUND INFORMATION

Set-top box devices have provided users of such devices with access to a large number and variety of media content programs and services. For example, a user may choose to experience a variety of broadcast television programs, pay-per-view services, video-on-demand programming, and audio programming via a set-top box device.

However, it is often cumbersome for a user to control how a set-top box device operates. For example, a traditional remote control device configured to control a set-top box device often includes a plethora of buttons, some of which are never utilized by the user. Hence, it is often difficult for a user to locate and select a sequence of buttons that may be required to perform a particular set-top box device operation.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
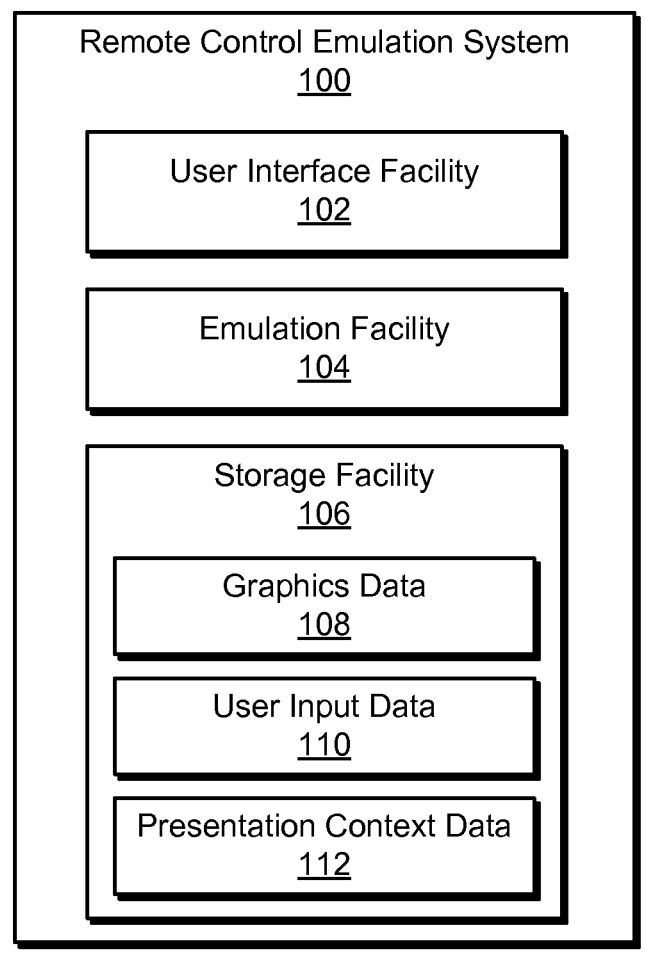
FIG. 1 illustrates an exemplary remote control emulation system according to principles described herein.

Exemplary remote control emulation methods and systems are described herein. As described in more detail below, a remote control emulation system may direct a mobile device to display an emulation graphical user interface ("GUI") on a display screen of the mobile device and emulate one or more user input devices by selectively positioning one or more interactive graphical depictions of one or more feature sets associated with the one or more user input devices within the emulation GUI.

For example, the remote control emulation system may direct the mobile device to emulate a first user input device associated with a media content access device by positioning an interactive graphical depiction of a feature set associated with the first user input device within the emulation GUI. As will be described below, the remote control emulation system may selectively replace the interactive graphical depiction positioned within the emulation GUI with another interactive graphical depiction of another feature set associated with the first user input device if a first type of touch gesture is performed by a user of the mobile device. Alternatively, the remote control emulation system may direct the mobile device to dynamically switch from emulating the first user input device to emulating a second user input device associated with the media content access device if a second type of touch gesture is performed by the user.

As used herein, a "touch gesture" refers to any movement of a finger or other object (e.g., a stylus) associated with the user while the finger or object is touching a display screen of a mobile device. As illustrated below, an exemplary first type of touch gesture may include a generally vertical up or down directional touch gesture and an exemplary second type of touch gesture may include a generally horizontal left-to-right or right-to-left directional touch gesture. However, it will be recognized that the first and second types of touch gestures may each alternatively include any other type of touch gesture as may serve a particular implementation.

Additionally or alternatively, the remote control emulation system may direct the mobile device to emulate at least one user input device associated with the media content access device by positioning a first interactive graphical depiction of a first feature set associated with the at least one user input device within the emulation GUI. The remote control emulation system may then detect a first user input command provided by a user by way of the first interactive graphical depiction, predict a possible second user input command to be provided by the user based on the first user input command, and automatically replace, in response to the predicting of the possible second user input command, the first interactive graphical depiction positioned within the emulation GUI with a second interactive graphical depiction of a second feature set associated with the at least one user input device. As will be described below, the second interactive graphical depiction may be configured to facilitate a providing of the possible second user input command.

Additionally or alternatively, the remote control emulation system may detect a change in a presentation context associated with the media content access device while the first interactive graphical depiction is positioned within the emulation GUI. In response, the remote control emulation system may automatically replace the first interactive graphical depiction positioned within the emulation GUI with a second interactive graphical depiction of a second feature set associated with the at least one user input device. As will be described below, the second interactive graphical depiction may be configured to facilitate a providing of one or more user input commands in the changed presentation context.

As used herein, "media content" may refer generally to any content accessible via a media content access device. The term "media content instance" will be used herein to refer to any television program, on-demand media program, pay-per-view media program, broadcast media program (e.g., broadcast television program), IPTV media content, advertisement (e.g., commercial), video, movie, song, video game, image, photograph, sound, or any segment, component, or combination of these or other forms of media content that may be viewed or otherwise experienced by a user.

FIG. 1 illustrates an exemplary remote control emulation system 100 (or simply "system 100"). System 100 may be configured to selectively emulate one or more user input devices (e.g., a remote control device, a favorites selection device, a touchpad device, a qwerty keyboard device, a video game controller device, and/or any other type of user input device) associated with a media content access device (e.g., a set-top box device). In this manner, as will be described below, system 100 may facilitate control by a mobile device (e.g., a mobile phone device, a tablet computer, etc.) of one or more operations of the media content access device, thereby resulting in an easy-to-use, convenient, and enjoyable media content access device control experience for a user.

System 100 may include a user interface facility 102, an emulation facility 104, and a storage facility 106, which may be in communication with one another using any suitable communication technologies. Each of these facilities will now be described.

User interface facility 102 may be configured to provide one or more graphical user interfaces ("GUIs") through which one or more functions, options, features, and/or tools may be provided to a user and through which user input may be received. In some examples, user interface facility 102 may direct a mobile device to display an emulation GUI on a display screen of the mobile device. As will be described, one or more user input device emulation features may be provided by way of the emulation GUI. One or more user input commands configured to control one or more operations of a media content access device may also be received by way of the emulation GUI. An exemplary emulation GUI will be described in more detail below.

Emulation facility 104 may be configured to perform one or more user input device emulation operations. For example, emulation facility 104 may be configured to direct a mobile device to selectively emulate one or more user input devices associated with (i.e., configured to control) a media content access device by selectively positioning one or more interactive graphical depictions of one or more feature sets associated with the one or more user input devices within the emulation GUI provided by user interface facility 102.

To illustrate, emulation facility 104 may direct the mobile device to initially emulate a remote control device associated with the media content access device by positioning an interactive graphical depiction of a feature set associated with the remote control device within the emulation GUI. Emulation facility 104 may subsequently detect a touch gesture (or any other suitable user input) performed by a user of the mobile device. The touch gesture may be configured to indicate a desire of the user for the mobile device to emulate a qwerty keyboard device associated with the media content access device. In response to detecting the touch gesture, emulation facility 104 may direct the mobile device to switch from emulating the remote control device to emulating the qwerty keyboard device by replacing the interactive graphical depiction associated with the remote control device with an interactive graphical depiction associated with the qwerty keyboard device within the emulation GUI. Subsequent touch gestures of the same type may result in emulation facility 104 selectively emulating a plurality of other user input devices.

Emulation facility 104 may additionally or alternatively be configured to selectively position different interactive graphical depictions of different feature sets associated with a particular user input device within the emulation GUI in response to a particular type of touch gesture (or any other suitable user input) performed by the user of the mobile device. In this manner, different feature sets associated with the particular user input device may be readily accessed by the user. Exemplary feature sets associated with a particular user input device will be described in more detail below.

Emulation facility 104 may be further configured to facilitate a user providing one or more user input commands for transmission from the mobile device to the media content access device. For example, a user may select (e.g., touch) a graphical representation of a "channel up" command included in a graphical depiction of a feature set associated with a remote control device. Emulation facility 104 may detect the selection of the channel up command and transmit the channel up command to the media content access device. The command may be transmitted from the mobile device to the media content access device in any suitable manner (e.g., by way of an infrared link, a network (e.g., a local area network), a Bluetooth connection, and/or in any other manner as may serve a particular implementation).

In some examples, emulation facility 104 may analyze a particular user input command provided by a user to predict a possible subsequent user input command that may be provided by the user. Based on the predicted subsequent user input command, emulation facility 104 may automatically replace the interactive graphical depiction located within the emulation GUI with a different interactive graphical depiction of a different feature set associated with any of the user input devices described herein.

For example, a user may provide a user input command configured to initiate a keyword search among the media content instances accessible by way of the media content access device. The user input command may be provided by way of an interactive graphical depiction of a feature set associated with a remote control device. Emulation facility 104 may predict, based on the user input command configured to initiate the keyword search that a subsequent user input command may include one or more text characters. Hence, emulation facility 104 may direct the mobile device to automatically emulate a qwerty keyboard device so that the user may enter the one or more text characters.

Emulation facility 104 may be further configured to detect a particular presentation context associated with the media content access device and provide an interactive graphical depiction associated with a particular feature set most relevant to the presentation context for display within the interactive GUI. As used herein, a "presentation context" refers to a particular presentation state of the media content access device. For example, a presentation context may refer to or be representative of a particular media content instance (e.g., a movie or television program), menu option (e.g., interactive program guide), or other content being presented by the media content access device at a particular time. Additionally or alternatively, a presentation context may refer to or be representative of a particular channel to which the media content access device is tuned, an identity of the user experiencing a media content instance being presented by the media content access device, and/or any other factor associated with a presentation of content by the media content access device.

To illustrate, emulation facility 104 may direct the mobile device to initially display a first interactive graphical depiction of a feature set corresponding to a first zone of a remote control device (e.g., a zone including one or more options configured to allow a user to select a particular recorded media content instance for playback by the media content access device). The user may input one or more user input commands by way of the first interactive graphical depiction that may cause the media content access device to begin playing back the recorded media content instance. Emulation facility 104 may detect the change in presentation context (i.e., that the media content access device has begun playing back a recorded media content instance) and direct the mobile device to automatically replace the first interactive graphical depiction displayed within the emulation GUI with a second interactive graphical depiction of a feature set corresponding to a second zone of the remote control device (e.g., a zone including one or more trick play options that may be selected during the playback of the recorded media content instance).

Storage facility 106 may be configured to maintain graphics data 108 representative of one or more interactive graphical depictions, user input data 110 representative of one or more user input commands provided by way of the one or more interactive graphical depictions, and presentation context data 112 representative of a presentation context associated with the media content access device. Storage facility 106 may maintain additional or alternative data as may serve a particular implementation.

Figure 2:
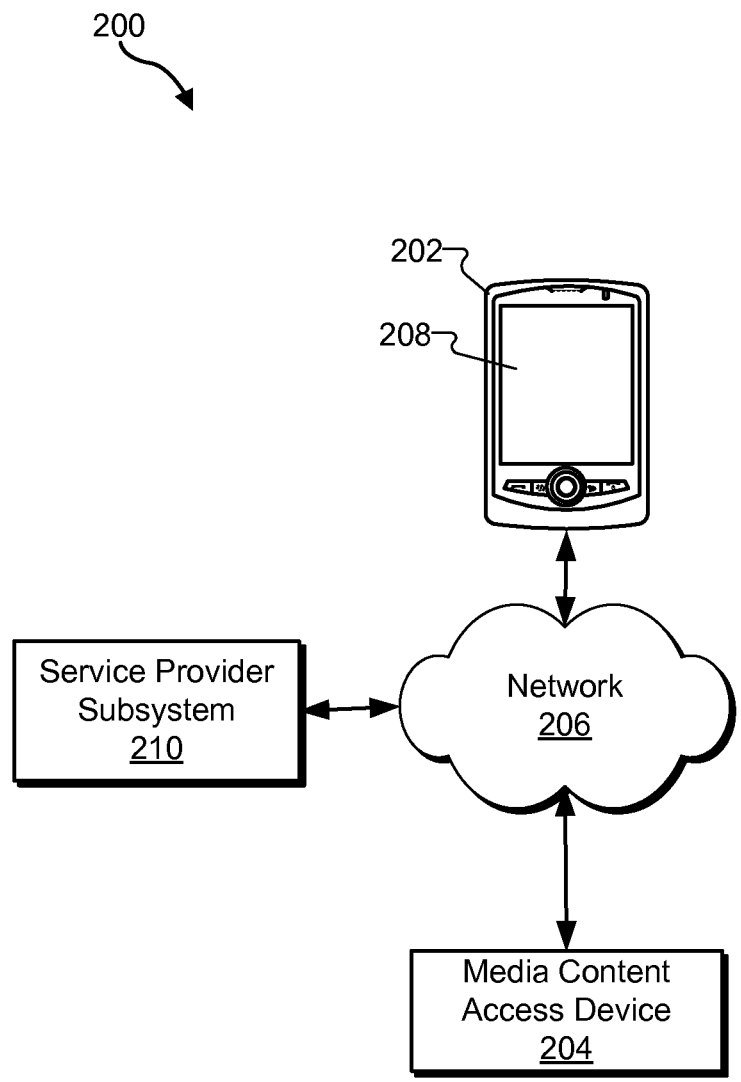
FIG. 2 illustrates an exemplary implementation of the system of FIG. 1 according to principles described herein.

FIG. 2 illustrates an exemplary implementation 200 of system 100. As shown, implementation 200 may include a mobile device 202 configured to communicate with a media content access device 204 by way of a network 206. Mobile device 202 may include any mobile computing device such as, but not limited to, a mobile phone, a smartphone, a personal digital assistant ("PDA"), a portable media player (e.g., an iPod or the like), a tablet computer (e.g., an iPad or the like), and/or any other suitable mobile device. As shown in FIG. 2, a display screen 208 may be included as part of mobile device 202. Display screen 208 may be configured to display the emulation GUIs described herein and/or any other content as may serve a particular implementation.

Media content access device 204 may include, but is not limited to, a set-top box device, a digital video recording ("DVR") device, a multi-room DVR device, a media content processing device, a personal computer, a gaming device, a television device, and/or any device configured to facilitate access to one or more forms of media content.

Mobile device 202 and media content access device 204 may communicate using any suitable communication technologies, devices, networks, media, and protocols supportive of data communications. For example, mobile device 202 and media content access device 204 may communicate over network 206 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 206 may include one or more networks or types of networks (and communication links thereto) capable of carrying communications, media content, and/or data signals between mobile device 202 and media content access device 204. For example, network 206 may include, but is not limited to, one or more local area networks (e.g., a home Wi-Fi network), wireless data networks (e.g., a mobile phone voice or data network), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, public networks, private networks, packet-switched networks, and any other networks capable of carrying data and/or communications signals between mobile device 202 and media content access device 204. Communications between mobile device 202 and media content access device 204 may be transported using any one of above-listed networks, or any combination or sub-combination of the above-listed networks.

While FIG. 2 shows mobile device 202 and media content access device 204 communicatively coupled via network 206, it will be recognized that mobile device 202 and media content access device 204 may be configured to communicate one with another in any other suitable manner (e.g., via an infrared connection).

FIG. 2 also shows that a service provider subsystem 210 may be communicatively coupled to mobile device 202 and/or media content access device 204 by way of network 206. Service provider subsystem 210 may include any number of components associated with a particular service provider (e.g., a television service provider) and may be configured to provide media content to media content access device 204 in any suitable manner. Service provider subsystem 210 may additionally or alternatively communicate with mobile device 202. For example, service provider subsystem 210 may provide program guide data, presentation context data, and/or any other data to mobile device 202.

The facilities of system 100 may be implemented by mobile device 202, media content access device 204, service provider subsystem 210, or any combination or sub-combination thereof. For example, mobile device 202 may be configured to execute one or more applications (or "apps") configured to facilitate performance of one or more of the emulation processes described herein.

Figure 3:
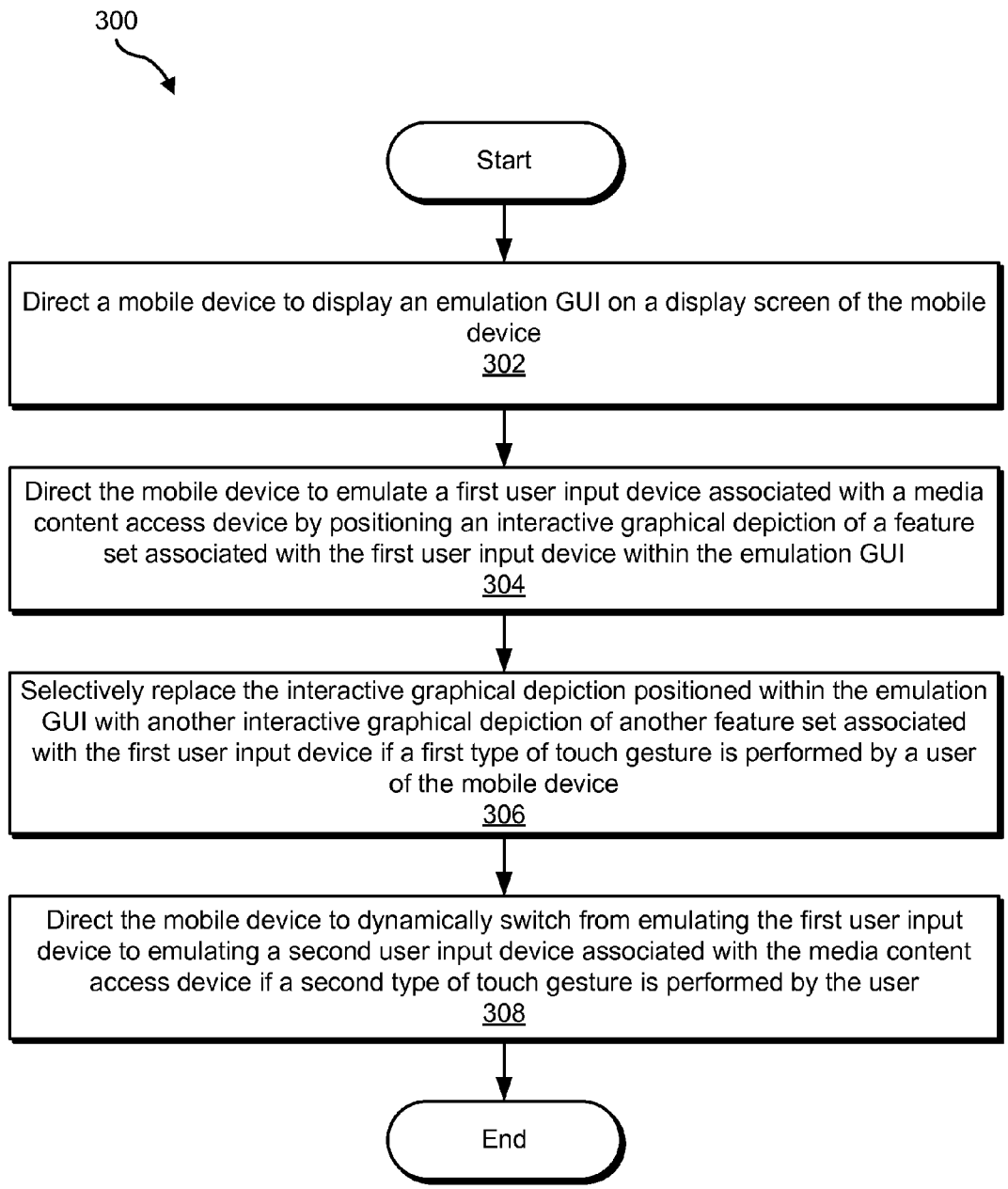
FIG. 3 illustrates an exemplary remote control emulation method according to principles described herein.

FIG. 3 illustrates an exemplary remote control emulation method 300. While FIG. 3 illustrates exemplary steps according to one embodiment, other embodiments may omit, add to, reorder, and/or modify any of the steps shown in FIG. 3. The steps shown in FIG. 3 may be performed by any component or combination of components of system 100, mobile device 202, media content access device 204, and/or service provider subsystem 210.

In step 302, a mobile device is directed to display an emulation GUI on a display screen of the mobile device. Step 302 may be performed in any of the ways described herein.

In step 304, the mobile device is directed to emulate a first user input device associated with a media content access device by positioning an interactive graphical depiction of a feature set associated with the first user input device within the emulation GUI. Step 304 may be performed in any of the ways described herein.

In step 306, the interactive graphical depiction positioned within the emulation GUI is selectively replaced with another interactive graphical depiction of another feature set associated with the first user input device if a first type of touch gesture is performed by a user of the mobile device. Step 306 may be performed in any of the ways described herein.

In step 308, the mobile device is directed to dynamically switch from emulating the first user input device to emulating a second user input device associated with the media content access device if a second type of touch gesture is performed by the user.

An exemplary implementation of method 300 will now be described in connection with FIGS. 4-12. FIGS. 4-12 illustrate various interactive graphical depictions of feature sets associated with a plurality of different user input devices that may be selectively displayed within an emulation GUI displayed on a display screen of a mobile device.

Figure 4:
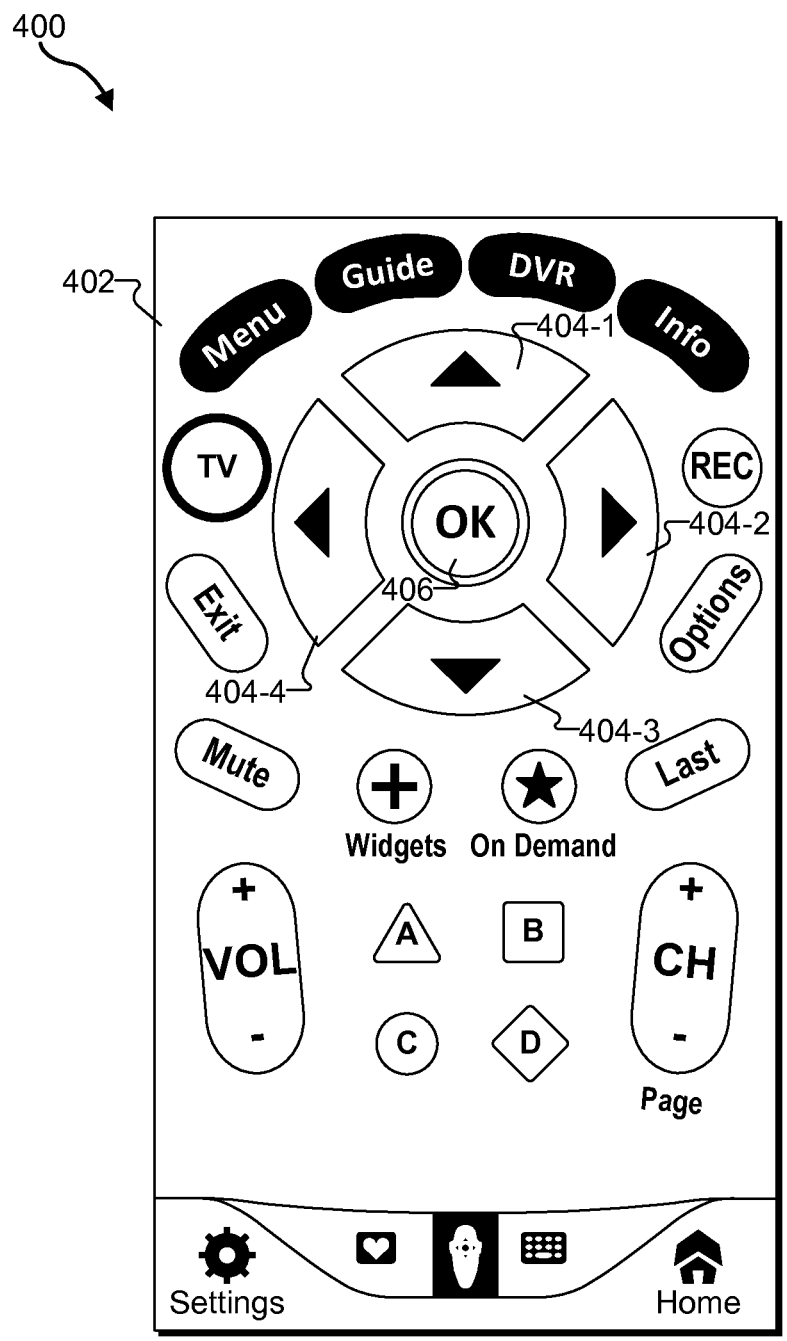
FIGS. 4-12 illustrate various interactive graphical depictions of feature sets associated with a plurality of different user input devices according to principles described herein.

FIG. 4 shows an exemplary emulation GUI 400 having an interactive graphical depiction 402 initially displayed therein.

As shown, interactive graphical depiction 402 represents a feature set associated with a remote control device configured to control a media content access device. For example, as shown in FIG. 4, the feature set represented by interactive graphical depiction 402 includes channel up and down buttons, volume up and down buttons, function buttons (e.g., functions A, B, C, and D), buttons representing various options (e.g., "menu," "guide," "DVR," "info," "record," "mute," "widgets," "on demand," "last," "options," etc.), and a directional pad (i.e., directional buttons 404-1 through 404-4 and an "ok" button 406).

It will be recognized that the dimensions of the display screen on some mobile devices are relatively smaller than the dimension of some physical user input devices. For this reason, it may not be desirable to include all the features associated with a particular user input device within a single interactive graphical depiction.

For example, the remote control device corresponding to interactive graphical depiction 402 may have additional features not included in interactive graphical depiction 402. Hence, the remote control device may be conceptually divided into multiple zones each including a subset of a total number of features of the remote control device. Each zone may be represented by an interactive graphical depiction that may be selectively positioned within emulation GUI 400. For illustrative purposes only, it will be assumed that the remote control device is conceptually divided into three zones and that the feature set represented by interactive graphical depiction 402 includes features located within a first zone of the remote control device. To access features included in the second and third zones, a user may perform one or more touch gestures of a first type.

Figure 5:
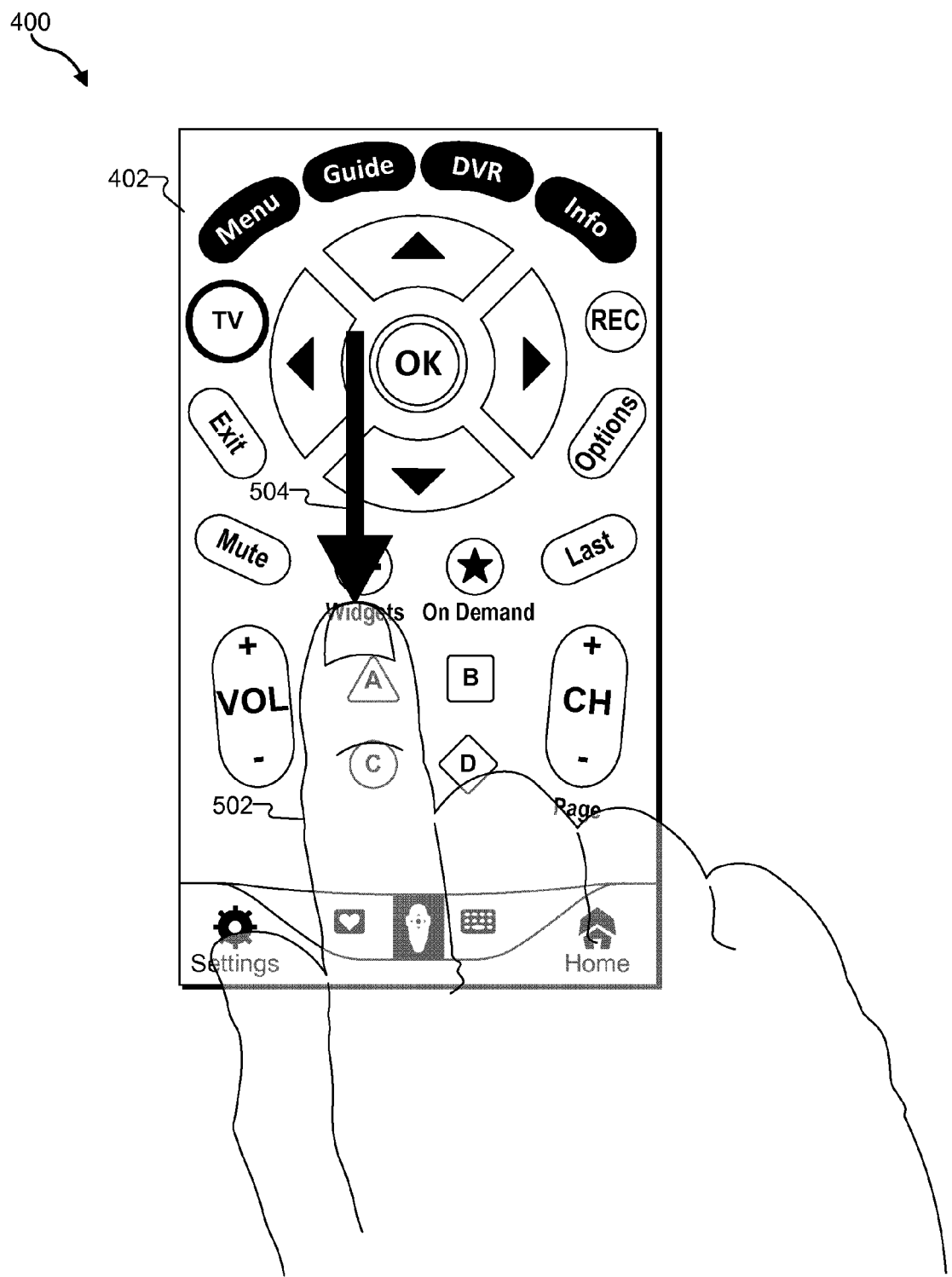

For example, FIG. 5 illustrates a finger 502 of a user performing a predefined touch gesture, such as a generally vertical downward touch gesture (i.e., a downward "swipe") indicated by arrow 504, across at least a portion of the display screen of the mobile device while emulation GUI 400 is displayed thereon. Emulation facility 104 may detect the vertical touch gesture and, in response, selectively replace interactive graphical depiction 402 with another interactive graphical depiction of a feature set corresponding to the second zone of the remote control device.

Figure 6:
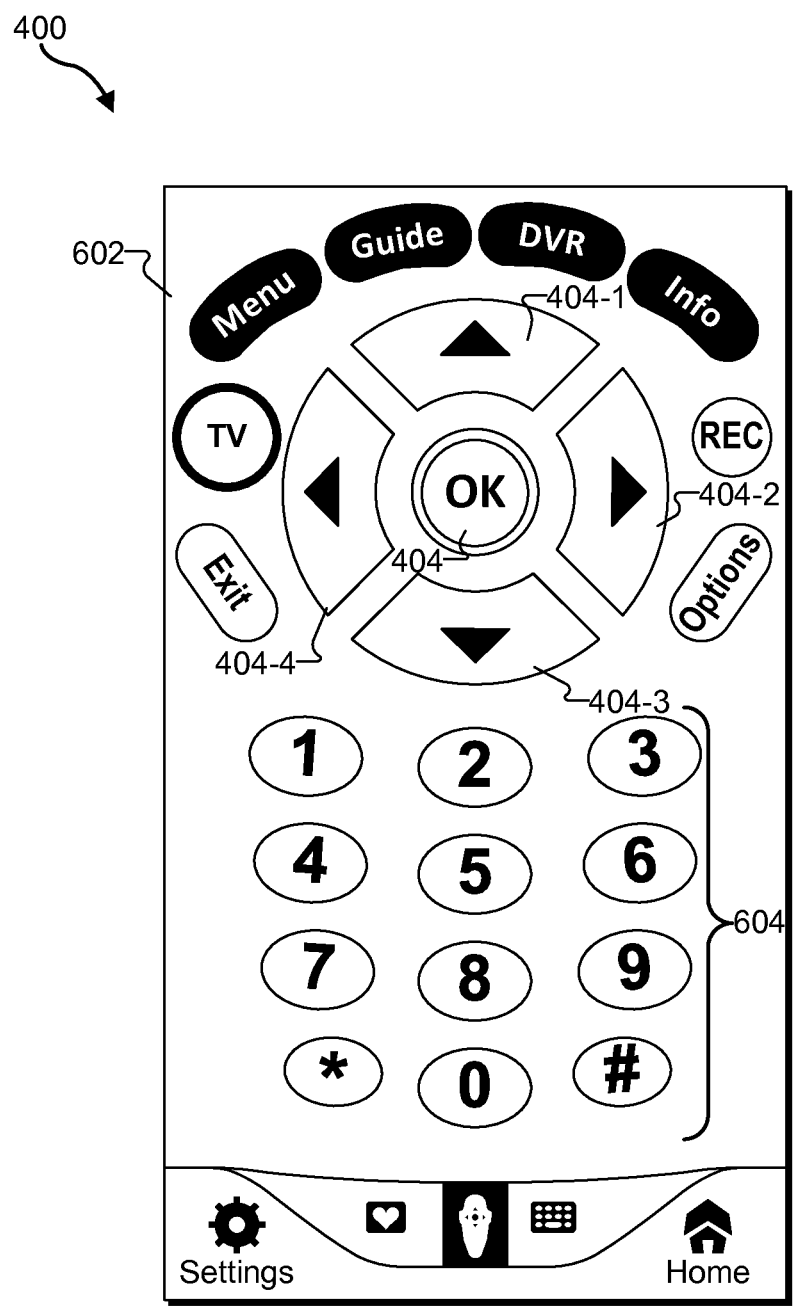

To illustrate, FIG. 6 shows an interactive graphical depiction 602 displayed within emulation GUI 400 after a vertical touch gesture has been detected. Emulation facility 104 may be configured to selectively replace interactive graphical depiction 402 with interactive graphical depiction 602 within emulation GUI 400 in any suitable manner. For example, one or more animation effects may be used to visually depict a transition between interactive graphical depiction 402 and interactive graphical depiction 602 being displayed within emulation GUI 400. To illustrate, as the predefined touch gesture shown in FIG. 5 is performed, interactive graphical depiction 602 may "slide" into emulation GUI 400 as interactive graphical depiction 402 "drops" out of emulation GUI 400. Additionally or alternatively, interactive graphical depiction 402 may visually break up into a plurality of "puzzle pieces" in response to the performance of the predefined touch gesture. The puzzle pieces may then come back together in the form of interactive graphical depiction 602. Any other animation effect may be used to visually indicate the transition between interactive graphical depiction 402 and interactive graphical depiction 602.

As shown in FIG. 6, interactive graphical depiction 602 represents a feature set that includes a number pad 604. In some examples, one or more features included in interactive graphical depiction 402 are also included in interactive graphical depiction 602. For example, the directional pad (i.e., directional buttons 404-1 through 404-4 and "ok" button 406) and various other options included in interactive graphical depiction 402 are also included in interactive graphical depiction 602. In this manner, a user does not have to switch between multiple interactive graphical depictions (e.g., interactive graphical depiction 402 and interactive graphical depiction 602) to access commonly used features (e.g., the directional pad).

Figure 7:
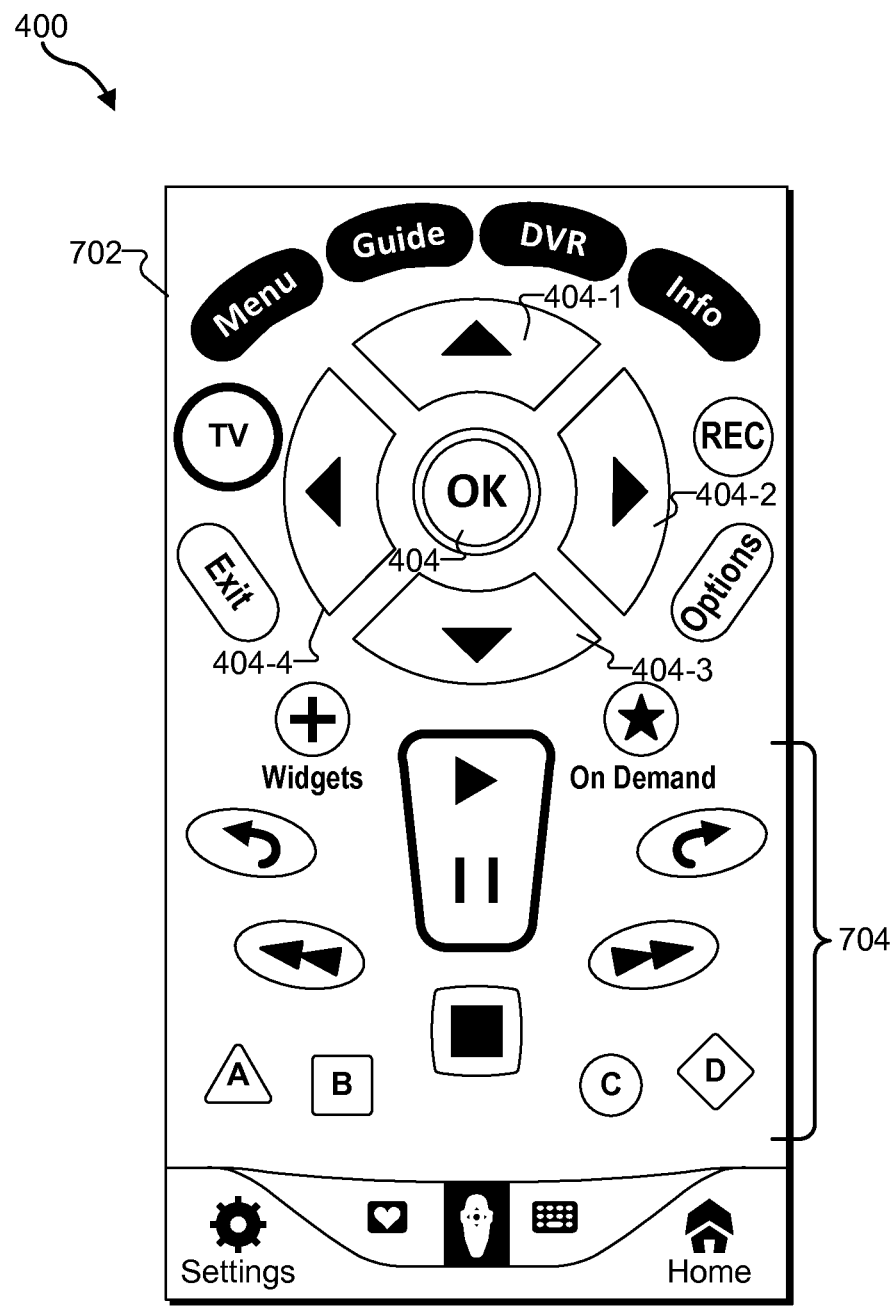

FIG. 7 shows an interactive graphical depiction 702 of a feature set that corresponds to the third zone of the remote control device. Interactive graphical depiction 702 may be selectively positioned within emulation GUI 400 in response to another vertical touch gesture being performed by the user.

As shown in FIG. 7, interactive graphical depiction 702 represents a plurality of trick play features 704. Trick play features 704 may be used while the user is experiencing a playback of a recorded media content instance, for example. Interactive graphical depiction 702 may further include various features (e.g., the directional pad) included in interactive graphical depictions 402 and 602 as described above.

A user may switch between (e.g., cycle through) interactive graphical depictions 402, 602, and 702 by performing one or more vertical downward or upward touch gestures. In this manner, the user may quickly and easily access any of the features represented by interactive graphical depictions 402, 602, and 702. In some examples, a small graphical depiction of the entire remote control device may be displayed within emulation GUI 400 during a transition between any of interactive graphical depictions 402, 602, and 702. A highlight box or the light may be positioned over whichever zone is currently displayed within emulation GUI 500 and may dynamically move to another zone as the user transitions to an interactive graphical depiction of that zone. In this manner, a user may readily see which zone he or she is currently in in relation to the entire remote control device.

At any time during which interactive graphical depictions 402, 602, and 702 are displayed within emulation GUI 400, a user may desire to access one or more features corresponding to a different user input device that is associated with the media content access device. To this end, the user may perform a second type of touch gesture. In response, whichever interactive graphical depiction that is currently positioned within emulation GUI 400 may be replaced by an interactive graphical depiction of a feature set associated with the different user input device.

Figure 8:
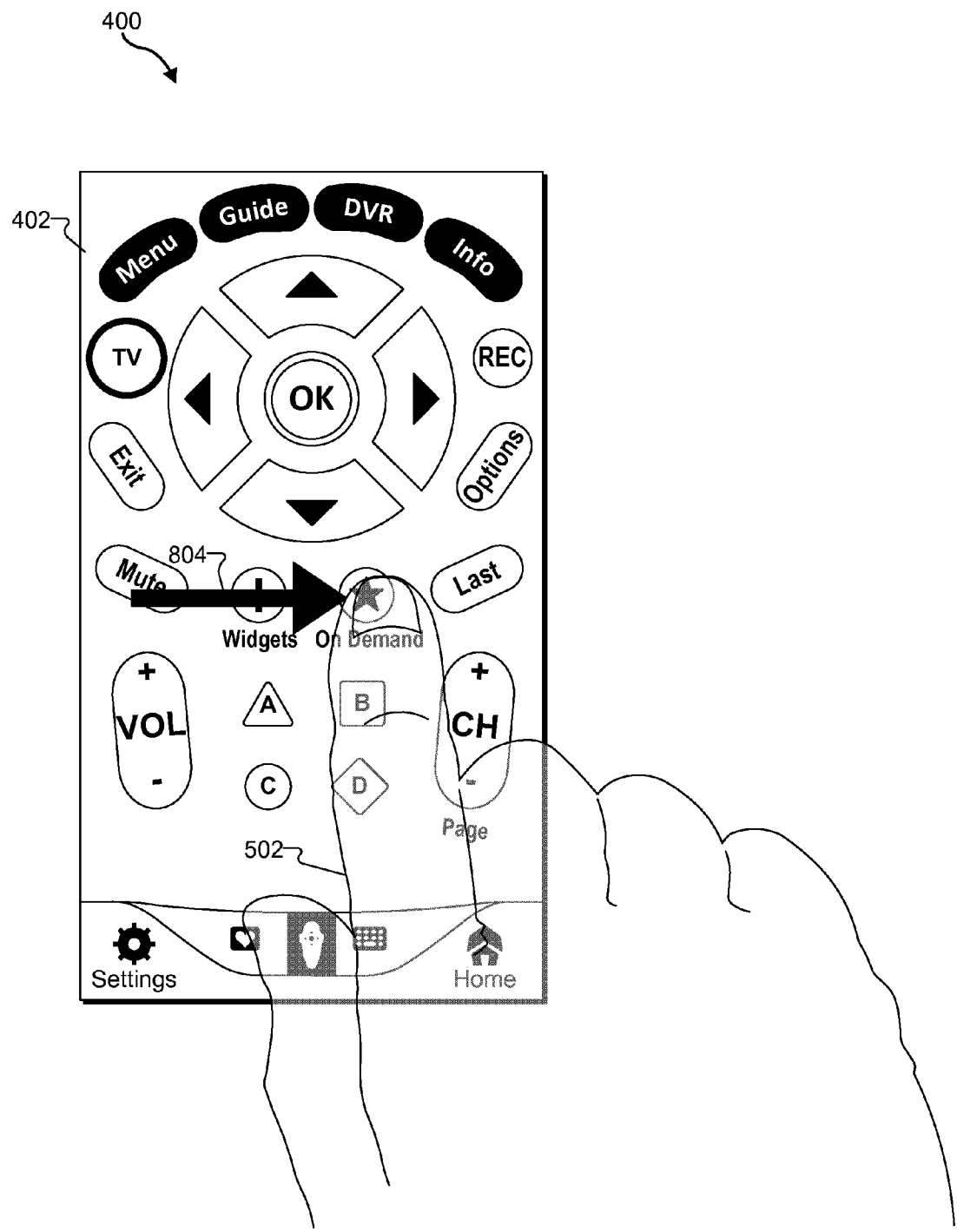

To illustrate, FIG. 8 shows the finger 502 of a user performing a predefined touch gesture, such as a generally horizontal left-to-right touch gesture (i.e., a sideways "swipe") indicated by arrow 804, across at least a portion of the display screen of the mobile device while interactive graphical depiction 402 is positioned within emulation GUI 400. Emulation facility 104 may detect the horizontal touch gesture and, in response, selectively replace interactive graphical depiction 402 with another interactive graphical depiction of a feature set corresponding to another user input device. In this manner, emulation facility 104 may direct the mobile device to dynamically switch from emulating the remote control device to emulating the other user input device.

Figure 9:

To illustrate, FIG. 9 shows an interactive graphical depiction 902 displayed within emulation GUI 400 after a horizontal touch gesture has been performed by the user. Interactive graphical depiction 902 may be displayed within emulation GUI 400 using any suitable animation effect as may serve a particular implementation.

As shown in FIG. 9, interactive graphical depiction 902 represents a feature set associated with a favorites selection device. For example, interactive graphical depiction 902 may include selectable icons associated with a plurality of channels, websites, or other sources of media content that the user has indicated as being one of his or her "favorites." Various other feature sets may be associated with the favorites selection device as may serve a particular implementation, interactive graphical depictions of which may be accessed in a similar manner to that described above. For example, other sets of icons associated with the favorites selection device may be accessed by performing one or more vertical touch gestures.

Figure 10:
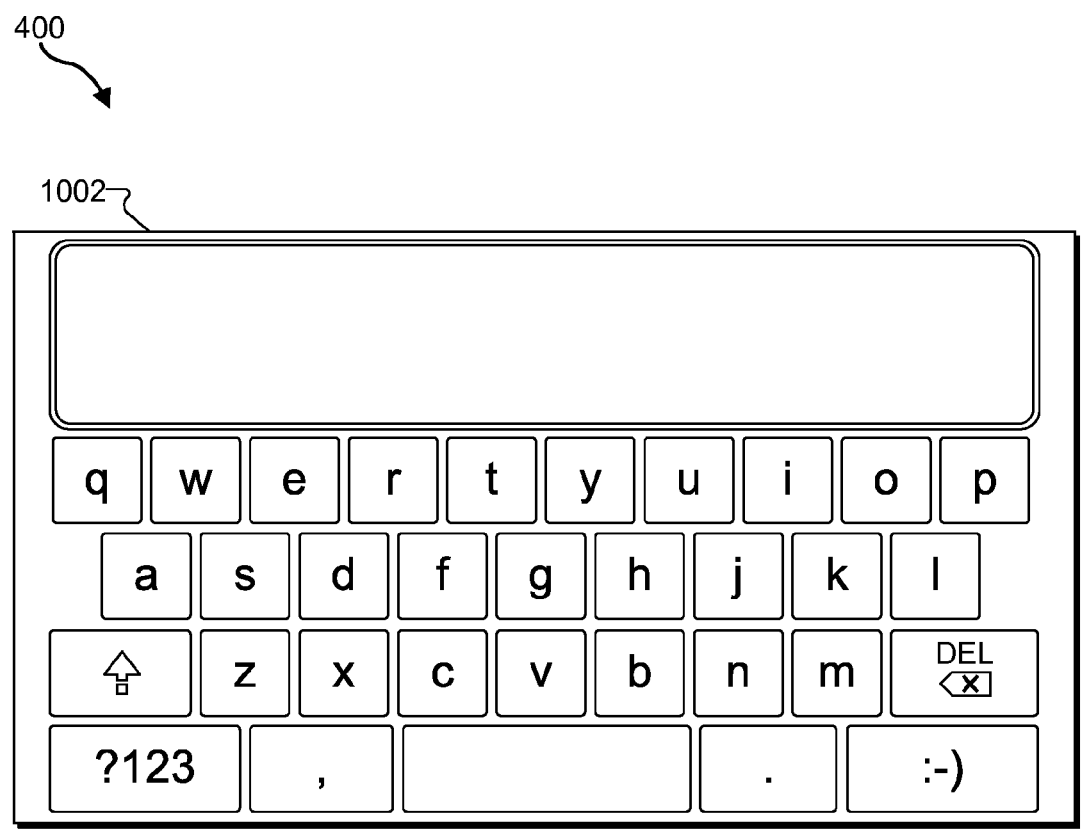

One or more additional horizontal touch gestures may be performed by the user to access feature sets associated with one or more other user input devices associated with the media content access device. For example, FIG. 10 shows an interactive graphical depiction 1002 displayed within emulation GUI 400 after another horizontal touch gesture has been performed by the user. As shown in FIG. 10, interactive graphical depiction 1002 represents a feature set associated with a qwerty keyboard device and may be used to provide text input to the media content access device. Various other feature sets may be associated with the qwerty keyboard device as may serve a particular implementation, interactive graphical depictions of which may be accessed in a similar manner to that described above. For example, an "all caps" feature set associated with the qwerty keyboard device may be accessed by performing a vertical touch gesture while interactive graphical depiction 1002 is displayed within emulation GUI 400.

Figure 11:
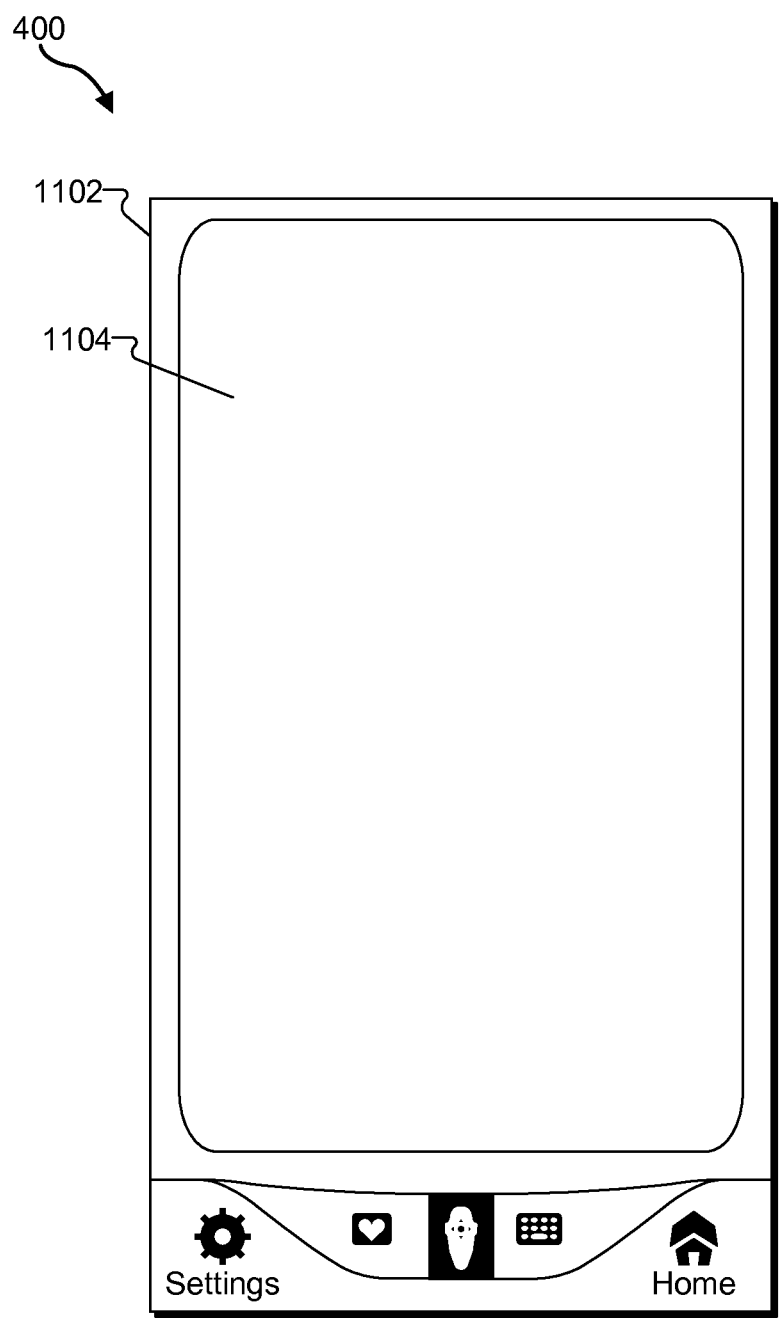

FIG. 11 shows another interactive graphical depiction 1102 displayed within emulation GUI 400 after another horizontal touch gesture has been performed by the user. As shown in FIG. 11, interactive graphical depiction 1102 represents a feature set associated with a touchpad device and may be used to position a curser within a display of the media content access device. For example, the feature set may include a blank pad 1104 configured to receive touch input provided by a user that is configured to control a position of a cursor on a screen of a display device associated with the media content access device. Various other feature sets may be associated with the touchpad device as may serve a particular implementation, interactive graphical depictions of which may be accessed in a similar manner to that described above.

Figure 12:
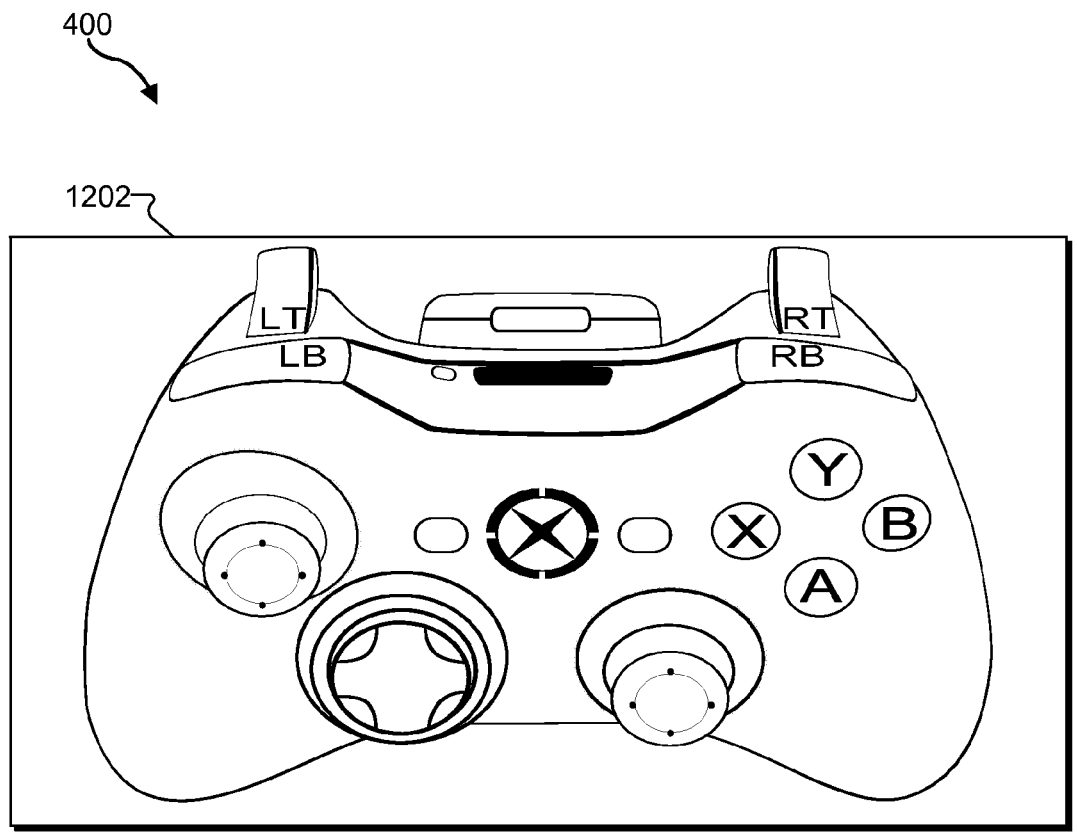

FIG. 12 shows another interactive graphical depiction 1202 displayed within emulation GUI 400 after another horizontal touch gesture has been performed by the user. As shown in FIG. 12, interactive graphical depiction 1202 represents a feature set associated with a video game controller device and may be used to provide various video game controller input commands to the media content access device. Various other feature sets may be associated with the video game controller device as may serve a particular implementation, interactive graphical depictions of which may be accessed in a similar manner to that described above.

As illustrated, a user may switch between (e.g., cycle through) interactive graphical depictions representative of different user input devices by performing one or more horizontal touch gestures. In this manner, the user may quickly and easily access any of the features associated with the different user input devices.

Figure 13:
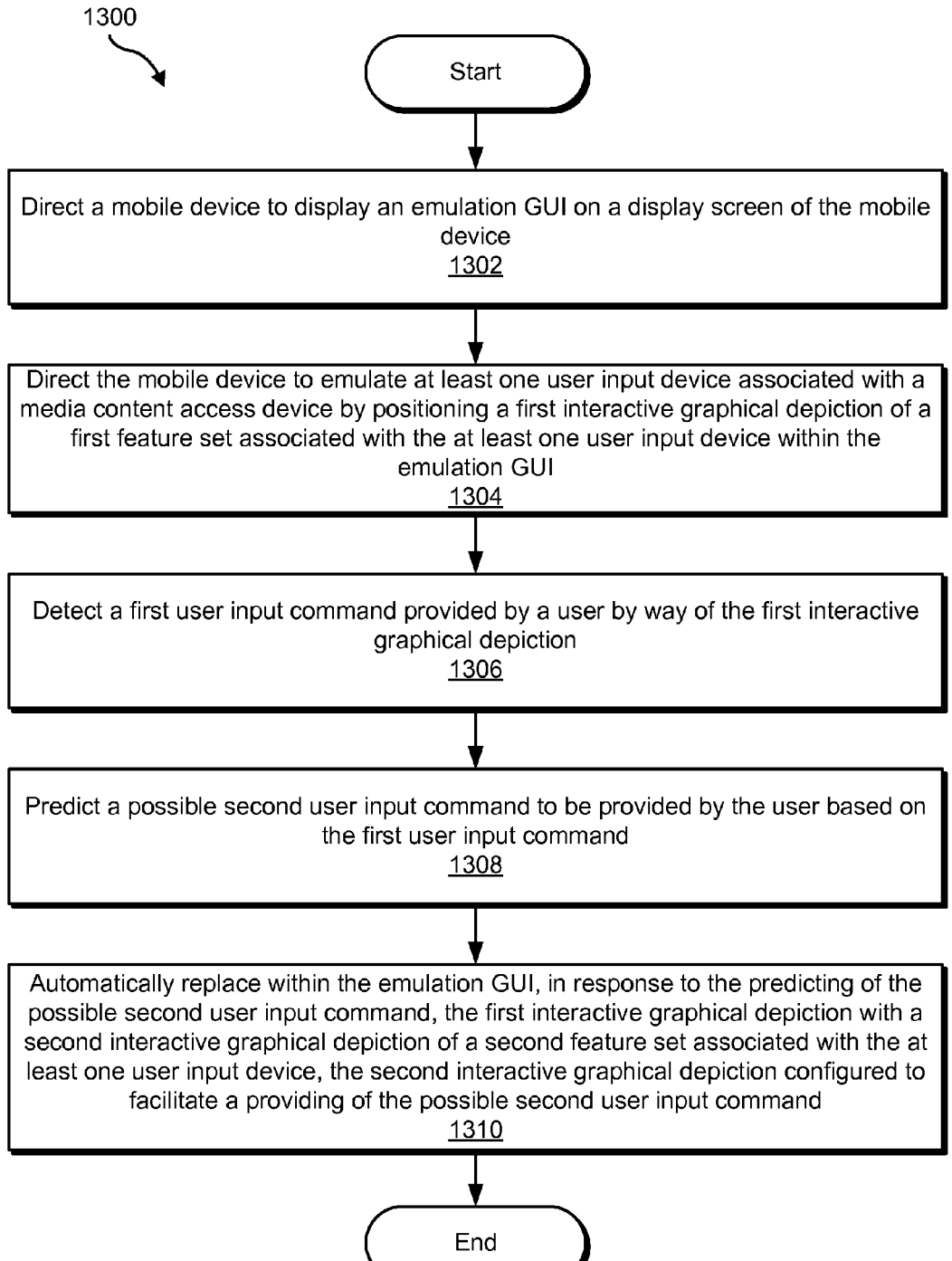
FIG. 13 illustrates another exemplary remote control emulation method according to principles described herein.

FIG. 13 illustrates another exemplary remote control emulation method 1300. While FIG. 13 illustrates exemplary steps according to one embodiment, other embodiments may omit, add to, reorder, and/or modify any of the steps shown in FIG. 13. The steps shown in FIG. 13 may be performed by any component or combination of components of system 100, mobile device 202, media content access device 204, and/or service provider subsystem 210.

In step 1302, a mobile device is directed to display an emulation GUI on a display screen of the mobile device. Step 1302 may be performed in any of the ways described herein.

In step 1304, the mobile device is directed to emulate at least one user input device associated with a media content access device by positioning a first interactive graphical depiction of a first feature set associated with the at least one user input device within the emulation GUI. Step 1304 may be performed in any of the ways described herein.

In step 1306, a first user input command provided by a user by way of the first interactive graphical depiction is detected. Step 1306 may be performed in any of the ways described herein.

In step 1308, a possible second user input command to be provided by the user is predicted based on the first user input command. Step 1308 may be performed in any of the ways described herein.

In step 1310, in response to the predicting of the possible second user input command, the first interactive graphical depiction is automatically replaced within the emulation GUI with a second interactive graphical depiction of a second feature set associated with the at least one user input device. The second interactive graphical depiction is configured to facilitate a providing of the possible second user input command. Step 1310 may be performed in any of the ways described herein.

An exemplary implementation of method 1300 includes the example given above in which a user may utilize an interactive graphical depiction (e.g., interactive graphical depiction 402) to provide a user input command configured to direct media content access device to initiate a keyword search among the media content instances accessible by way of the media content access device. Emulation facility 104 may predict, based on the user input command configured to initiate the keyword search that a subsequent user input command may include one or more text characters. As a result, emulation facility 104 may direct the mobile device to automatically emulate a qwerty keyboard device by positioning interactive graphical depiction 1002, for example, within emulation GUI 400 so that the user may enter the one or more text characters. It will be recognized that this example is merely illustrative of the many different implementations of method 1300 that may be realized in accordance with the methods and systems described herein.

Figure 14:
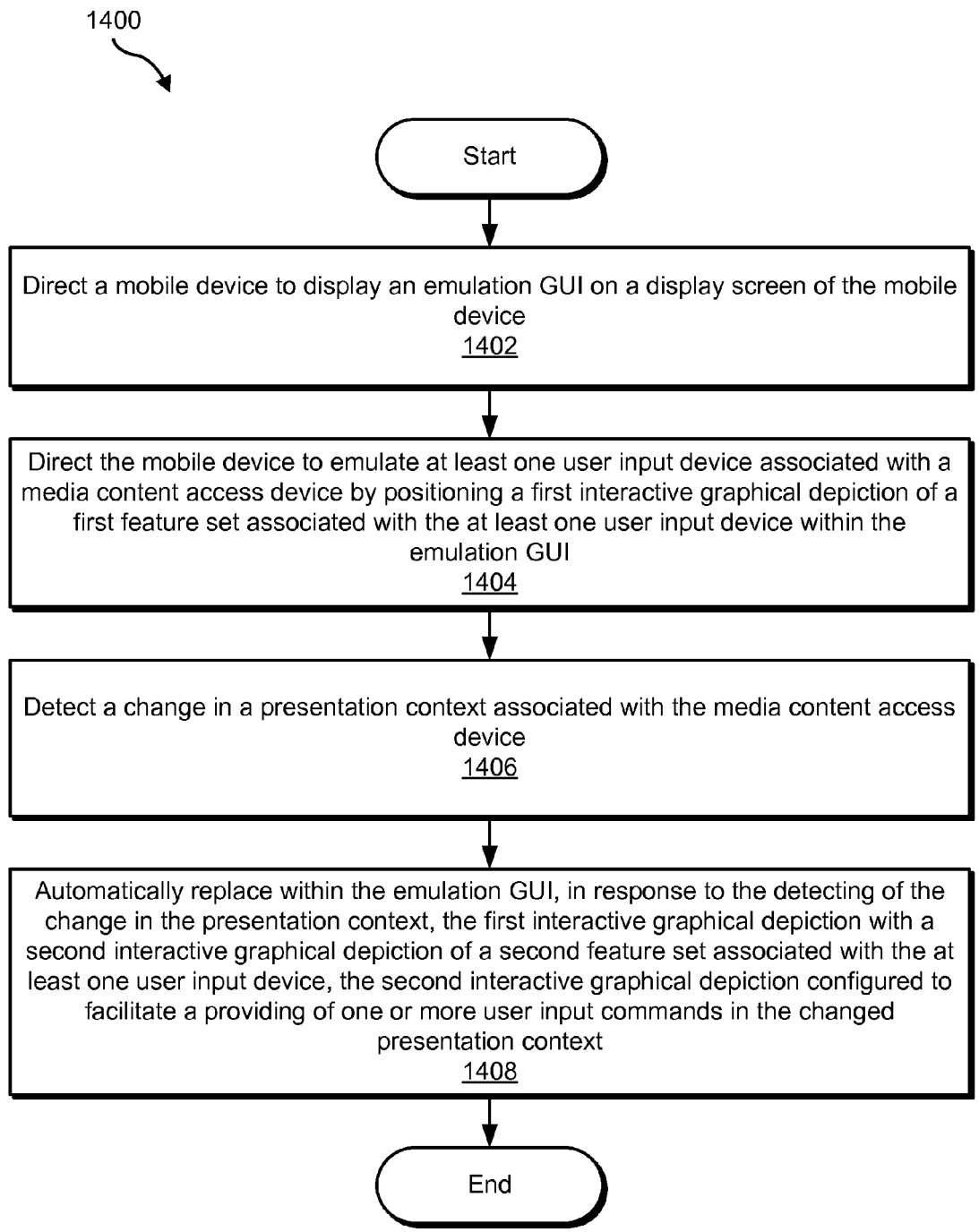
FIG. 14 illustrates another exemplary remote control emulation method according to principles described herein.

FIG. 14 illustrates another exemplary remote control emulation method 1400. While FIG. 14 illustrates exemplary steps according to one embodiment, other embodiments may omit, add to, reorder, and/or modify any of the steps shown in FIG. 14. The steps shown in FIG. 14 may be performed by any component or combination of components of system 100, mobile device 202, media content access device 204, and/or service provider subsystem 210.

In step 1402, a mobile device is directed to display an emulation GUI on a display screen of the mobile device. Step 1402 may be performed in any of the ways described herein.

In step 1404, the mobile device is directed to emulate at least one user input device associated with a media content access device by positioning a first interactive graphical depiction of a first feature set associated with the at least one user input device within the emulation GUI. Step 1404 may be performed in any of the ways described herein.

In step 1406, a change in a presentation context associated with the media content access device is detected. Step 1406 may be performed in any of the ways described herein.

In step 1408, in response to the detecting of the change in the presentation context, the first interactive graphical depiction is automatically replaced within the emulation GUI with a second interactive graphical depiction of a second feature set associated with the at least one user input device. The second interactive graphical depiction is configured to facilitate a providing of one or more user input commands in the changed presentation context. Step 1408 may be performed in any of the ways described herein.

An exemplary implementation of method 1400 includes the example given above in which a first interactive graphical depiction (e.g., interactive graphical depiction 402) may be used to select a particular recorded media content instance for playback by the media content access device. Emulation facility 104 may detect the change in presentation context that occurs when the media content access device begins playing back the recorded media content instance and direct the mobile device to automatically replace the first interactive graphical depiction displayed within the emulation GUI with a second interactive graphical depiction (e.g., interactive graphical depiction 702) of a feature set that includes one or more trick play options that may be selected during the playback of the recorded media content instance. It will be recognized that this example is merely illustrative of the many different implementations of method 1400 that may be realized in accordance with the methods and systems described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
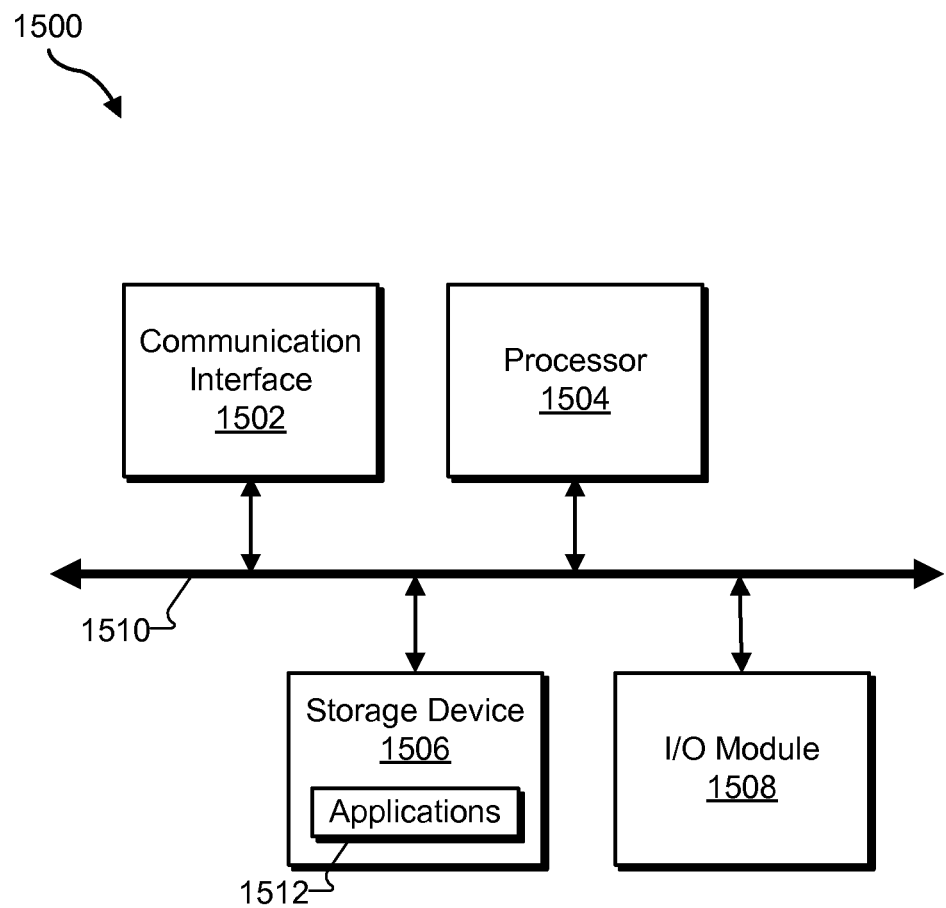
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 (which may include, but are not limited to, one or more of the software applications described herein) configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with user interface facility 102 and/or emulation facility 104. Likewise, storage facility 106 may be implemented by or within storage device 1506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
directing, by a remote control emulation system, a mobile device to display an emulation graphical user interface ("GUI") on a display screen of the mobile device;
directing, by the remote control emulation system, the mobile device to emulate a first user input device associated with a media content access device by positioning an interactive graphical depiction of a feature set associated with the first user input device within the emulation GUI, the interactive graphical depiction of the feature set including a graphical depiction of a plurality of user-selectable features that are located relative to each other in a manner corresponding to an actual location of similar features on the first user input device;
selectively replacing, by the remote control emulation system, the interactive graphical depiction positioned within the emulation GUI with another interactive graphical depiction of another feature set associated with the first user input device if a first type of touch gesture is performed by a user of the mobile device, the another feature set including at least some of the plurality of user-selectable features that are included in the feature set and that are located relative to each other in the manner corresponding to the actual location of the similar features on the first user input device, wherein the at least some of the plurality of user-selectable features are positioned at a same position within the emulation GUI when the interactive graphical depiction of the feature set is positioned within the emulation GUI and when the another interactive graphical depiction of the another feature set is positioned within the emulation GUI; and
directing, by the remote control emulation system, the mobile device to dynamically switch from emulating the first user input device to emulating a second user input device associated with the media content access device if a second type of touch gesture is performed by the user.

2. The method of claim 1, wherein the directing the mobile device to dynamically switch from emulating the first user input device to emulating the second user input device comprises positioning a second interactive graphical depiction of a second feature set associated with the second user input device within the emulation GUI.

3. The method of claim 1, wherein:
the first user input device comprises a remote control device configured to control an operation of the media content access device; and
the feature set corresponds to a first zone of the remote control device; and
the another feature set corresponds to a second zone of the remote control device.

4. The method of claim 3, wherein the feature set and the another feature set both include a directional pad.

5. The method of claim 1, further comprising:
detecting, by the remote control emulation system, the first type of touch gesture; and
selectively replacing within the emulation GUI, by the remote control emulation system in response to the detecting the first type of touch gesture, the interactive graphical depiction with the another graphical depiction.

6. The method of claim 1, further comprising:
detecting, by the remote control emulation system, the second type of touch gesture; and
directing, by the remote control emulation system in response to the detecting the second type of touch gesture, the mobile device to dynamically switch from emulating the first user input device to emulating the second user input device.

7. The method of claim 1, further comprising:
detecting, by the remote control emulation system, a user input command provided by the user by way of the interactive graphical depiction;
transmitting, by the remote control emulation system, the user input command to the media content access device.

8. The method of claim 7, further comprising:
predicting, by the remote control emulation system, a possible subsequent user input command to be provided by the user based on the user input command; and
automatically replacing, by the remote control emulation system in response to the predicting of the possible subsequent user input command, the interactive graphical depiction with a different interactive graphical depiction of a different feature set associated with the first user input device or another user input device within the emulation GUI, the different interactive graphical depiction configured to facilitate a providing of the possible subsequent user input command.

9. The method of claim 1, further comprising:
detecting, by the remote control emulation system, a change in a presentation context associated with the media content access device; and
automatically replacing within the emulation GUI, by the remote control emulation system in response to the detecting of the change in the presentation context, the interactive graphical depiction with a different interactive graphical depiction of a different feature set associated with the first user input device or another user input device, the different interactive graphical depiction configured to facilitate a providing of one or more user input commands in the changed presentation context.

10. The method of claim 1, wherein the first user input device comprises a remote control device, a favorites selection device, a touchpad device, a qwerty keyboard device, or a video game controller device.

11. The method of claim 1, wherein the second user input device comprises a remote control device, a favorites selection device, a touchpad device, a qwerty keyboard device, or a video game controller device.

12. The method of claim 1, embodied as computer-executable instructions on at least one non-transitory computer-readable medium.

13. A method comprising:
directing, by a remote control emulation system, a mobile device to display an emulation graphical user interface ("GUI") on a display screen of the mobile device;
directing, by the remote control emulation system, the mobile device to emulate at least one user input device associated with a media content access device by positioning a first interactive graphical depiction of a first feature set associated with the at least one user input device within the emulation GUI;
detecting, by the remote control emulation system, a first user input command provided by a user by way of the first interactive graphical depiction;
predicting, by the remote control emulation system, a possible second user input command to be provided by the user based on the first user input command;

automatically replacing within the emulation GUI, by the remote control emulation system in response to the predicting of the possible second user input command, the first interactive graphical depiction with a second interactive graphical depiction of a second feature set associated with the at least one user input device, the second interactive graphical depiction configured to facilitate a providing of the possible second user input command;

wherein the second interactive graphical depiction of the second feature set
- is associated with a first user input device included in the at least one user input device and
- includes a graphical depiction of a plurality of user-selectable features that are located relative to each other in a manner corresponding to an actual location of similar features on the first user input device, and wherein the method further comprises:

detecting, by the remote control emulation system, a touch gesture performed by the user while the second interactive graphical depiction is positioned within the emulation GUI; and selectively replacing, by the remote control emulation system in response to the touch gesture, the second interactive graphical depiction positioned within the emulation GUI with another interactive graphical depiction of another feature set associated with the first user input device, the another feature set including at least some of the plurality of user-selectable features that are included in the second feature set and that are located relative to each other in the manner corresponding to the actual location of the similar features on the first user input device, wherein the at least some of the plurality of user-selectable features are positioned at a same position within the emulation GUI when the interactive graphical depiction of the feature set is positioned within the emulation GUI and when the another interactive graphical depiction of the another feature set is positioned within the emulation GUI.

14. The method of claim 13, further comprising:

detecting, by the remote control emulation system, a change in a presentation context associated with the media content access device; and automatically replacing within the emulation GUI, by the remote control emulation system in response to the detecting of the change in the presentation context, the another interactive graphical depiction with a third interactive graphical depiction of a third feature set associated with the at least one user input device, the third interactive graphical depiction configured to facilitate a providing of one or more user input commands in the changed presentation context.

15. The method of claim 13, embodied as computer-executable instructions on at least one non-transitory computer-readable medium.

16. A method comprising:

directing, by a remote control emulation system, a mobile device to display an emulation graphical user interface ("GUI") on a display screen of the mobile device;

directing, by the remote control emulation system, the mobile device to emulate at least one user input device associated with a media content access device by positioning a first interactive graphical depiction of a first feature set associated with the at least one user input device within the emulation GUI;

detecting, by the remote control emulation system, a change in a presentation context of media content being played back by the media content access device; and automatically replacing within the emulation GUI, by the remote control emulation system in response to the detecting of the change in the presentation context, the first interactive graphical depiction with a second interactive graphical depiction of a second feature set associated with the at least one user input device, the second interactive graphical depiction configured to facilitate a providing of one or more user input commands in the changed presentation context, wherein the second interactive graphical depiction of the second feature set
- is associated with a first user input device included in the at least one user input device and
- includes a graphical depiction of a plurality of user-selectable features that are located relative to each other in a manner corresponding to an actual location of similar features on the first user input device, and wherein the method further comprises:

detecting, by the remote control emulation system, a touch gesture performed by a user while the second interactive graphical depiction is positioned within the emulation GUI; and selectively replacing, by the remote control emulation system in response to the touch gesture, the second interactive graphical depiction positioned within the emulation GUI with another interactive graphical depiction of another feature set associated with the first user input device, the another feature set including at least some of the plurality of user-selectable features that are included in the second feature set and that are located relative to each other in the manner corresponding to the actual location of the similar features on the first user input device, wherein the at least some of the plurality of user-selectable features are positioned at a same position within the emulation GUI when the interactive graphical depiction of the feature set is positioned within the emulation GUI and when the another interactive graphical depiction of the another feature set is positioned within the emulation GUI.

17. The method of claim 16, further comprising:

detecting, by the remote control emulation system, a first user input command provided by the user by way of the another interactive graphical depiction;

predicting, by the remote control emulation system, a possible second user input command to be provided by the user based on the first user input command; and automatically replacing within the emulation GUI, by the remote control emulation system in response to the predicting of the possible second user input command, the another interactive graphical depiction with a third interactive graphical depiction of a third feature set associated with the at least one user input device, the third interactive graphical depiction configured to facilitate a providing of the possible second user input command.

18. The method of claim 16, embodied as computer-executable instructions on at least one non-transitory computer-readable medium.

19. A system comprising:

at least one computing device that comprises
an emulation facility communicatively coupled to the user interface facility and that
directs the mobile device to emulate a first user input device associated with a media content access device by positioning an interactive graphical depiction of a feature set associated with the first user input device within the emulation GUI, the interactive graphical depiction of the feature set including a graphical depiction of a plurality of user-selectable features that are located relative to each other in a manner corresponding to an actual location of similar features on the first user input device, replaces the interactive graphical depiction positioned within the emulation GUI with another interactive graphical depiction of another feature set associated with the first user input device in response to a first type of touch gesture being performed by a user of the mobile device, the another feature set including at least some of the plurality of user-selectable features that are included in the feature set and that are located relative to each other in the manner corresponding to the actual location of the similar features on the first user input device, wherein the at least some of the plurality of user-selectable features are positioned at a same position within the emulation GUI when the interactive graphical depiction of the feature set is positioned within the emulation GUI and when the another interactive graphical depiction of the another feature set is positioned within the emulation GUI, and directs the mobile device to dynamically switch from emulating the first user input device to emulating a second user input device associated with the media content access device in response to a second type of touch gesture being performed by the user.

\* \* \* \* \*